US007015616B2

(12) United States Patent
Doherty et al.

(10) Patent No.: US 7,015,616 B2

(45) Date of Patent: Mar. 21, 2006

(54) SYSTEM AND METHOD FOR PROVIDING COIL RETENTION IN THE ROTOR WINDINGS OF A HIGH SPEED GENERATOR

(75) Inventors: Kieran Doherty, Oro Valley, AZ (US); David E. Stout, Tucson, AZ (US); Balwinider S. Birdi, Tucson, AZ (US); Edward M. Down, Tucson, AZ (US); Simon L. Waddell, Tucson, AZ (US); David J. Roden, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 352 days.

(21) Appl. No.: 10/113,701

(22) Filed: Apr. 1, 2002

(65) Prior Publication Data

US 2003/0184180 A1 Oct. 2, 2003

(51) Int. Cl.

| | |
|---|---|
| ***H02K 3/18*** | (2006.01) |
| ***H02K 3/46*** | (2006.01) |
| ***H02K 3/00*** | (2006.01) |
| ***H02K 1/22*** | (2006.01) |
| ***H02K 3/52*** | (2006.01) |

(52) U.S. Cl. ...................... 310/194; 310/179; 310/214; 310/40 R

(58) Field of Classification Search ................ 310/214, 310/179, 40 R, 10

See application file for complete search history.

(56) References Cited

U.S. PATENT DOCUMENTS 2,899,573 A * 8/1959 Wesolowski .............. 310/60 R
3,008,786 A * 11/1961 Costello ...................... 310/214
3,157,940 A 11/1964 Underwood ................. 29/597
3,454,805 A 7/1969 Fromm et al. .............. 310/260
3,596,120 A * 7/1971 Potter .......................... 310/41
3,617,782 A * 11/1971 Nakamura et al. ............ 310/11
3,739,212 A * 6/1973 Koelbel et al. ............. 310/194
3,766,417 A * 10/1973 Hallenbeck ................. 310/214
3,940,647 A * 2/1976 Keuper et al. .............. 310/214
3,952,406 A 4/1976 Madsen ....................... 29/598
4,072,873 A * 2/1978 Nottingham ................. 310/71
4,083,180 A * 4/1978 Thompson et al. ........... 60/791
4,182,027 A 1/1980 Benezech .................... 29/598
4,327,302 A * 4/1982 Hershberger ........... 310/156.56
4,345,175 A 8/1982 Jones .......................... 310/45
4,409,502 A * 10/1983 McCabria .................... 310/61
4,433,262 A 2/1984 Greenlee .................... 310/214
4,434,546 A * 3/1984 Hershberger ................. 29/598
4,437,325 A * 3/1984 Hershberger ................ 68/23.7
4,533,580 A 8/1985 Otty ............................ 428/36
4,667,125 A 5/1987 Kaminski et al. ........... 310/214
4,689,973 A * 9/1987 Hershberger ................ 68/23.7

(Continued)

FOREIGN PATENT DOCUMENTS

EP 0 008 250 A1 2/1980

(Continued)

*Primary Examiner*—Darren Schuberg
*Assistant Examiner*—Pedro J. Cuevas
(74) *Attorney, Agent, or Firm*—Ingrassia Fisher & Lorenz

(57) ABSTRACT

A coil retention system for a rotor of a high speed electrical generator, such as an aircraft generator, that uses compliant material to fill variable dimension voids and/or gaps in the coils wound around the rotor of an electrical machine. During processing of the rotor and coil retention system, the compliant material hardens and is able to withstand the centrifugal loads imposed by, and environmental conditions within, the high speed generator.

17 Claims, 7 Drawing Sheets

500
304a
504
518
502
304b
522
522
306a
306b
506

U.S. PATENT DOCUMENTS 4,694,663 A * 9/1987 Miller ........................ 62/51.1
4,774,429 A * 9/1988 Ueda .......................... 310/214
4,806,717 A * 2/1989 Hershberger ................ 318/138
4,831,303 A 5/1989 Rowe et al. ................ 310/260
4,990,810 A * 2/1991 Newhouse .................. 310/194
5,036,238 A * 7/1991 Tajima ....................... 310/214
RE33,655 E * 8/1991 Hershberger ................ 68/23.7
5,053,663 A 10/1991 Böer et al. .................... 310/91
5,122,698 A * 6/1992 Walker et al. .............. 310/214
5,140,204 A 8/1992 Cashmore et al. ............ 310/61
5,189,325 A * 2/1993 Jarczynski ................... 310/54
5,365,135 A 11/1994 Konrad et al. .............. 310/214
5,432,391 A 7/1995 Zawoysky .................. 310/270
5,598,049 A * 1/1997 Meier ......................... 310/214
5,731,651 A 3/1998 Hyodo ....................... 310/261
5,778,518 A 7/1998 Huber et al. .................. 29/736
5,841,194 A * 11/1998 Tsukamoto ................. 257/729
5,866,966 A * 2/1999 Fulton ........................ 310/214
5,925,275 A * 7/1999 Lawson et al. ............. 219/543
5,973,432 A * 10/1999 Katagiri et al. ............. 310/214
6,113,024 A * 9/2000 Pittard et al. ............... 242/433
6,225,723 B1 * 5/2001 Cooper et al. .............. 310/214
6,281,612 B1 * 8/2001 Asao et al. ................. 310/179
6,324,067 B1 * 11/2001 Nishiyama .................. 361/761
6,387,505 B1 * 5/2002 Imashiro et al. ............ 428/413
6,609,297 B1 * 8/2003 Hiramatsu et al. ............ 29/852
6,646,363 B1 * 11/2003 Kylander et al. ........... 310/194
6,703,733 B1 * 3/2004 Wang et al. .................. 310/85
6,703,748 B1 * 3/2004 Arai et al. .................. 310/179
6,713,928 B1 * 3/2004 Takizawa et al. ........... 310/214
6,759,771 B1 * 7/2004 Doherty et al. ............... 310/58
6,791,230 B1 * 9/2004 Tornquist et al. ........... 310/214
6,933,648 B1 * 8/2005 Buchan et al. .............. 310/214

FOREIGN PATENT DOCUMENTS

EP 1 005 135 A1 5/2000
WO WO 9604659 A1 * 2/1996
WO PCT/US03/09614 7/2003

* cited by examiner

SYSTEM AND METHOD FOR PROVIDING COIL RETENTION IN THE ROTOR WINDINGS OF A HIGH SPEED GENERATOR

BACKGROUND OF THE INVENTION

The present invention relates to high speed generators and, more particularly, to high speed generators used with gas turbine engines such as those used in aircraft, tanks, ships, terrestrial, or other applications.

Generator systems for aircraft may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator windings, and this three-phase AC output can then be provided to a load such as, for example, an aircraft electrical system.

Because some aircraft generators are high speed generators with potential rotational speeds up to and in excess of 24,000 rpm, potentially large centrifugal forces may be imposed upon the rotors in generators. Given these potentially stressful operating conditions, the rotors should be carefully designed and manufactured, so that the rotors are reliable and precisely balanced. Improper balancing not only can result in inefficiencies in the operation of a generator, but may also affect the reliability of in the generator.

Among the components of a rotor that provide increased reliability and proper balancing of the rotors are the wire coils wound on the rotor. The centrifugal forces experienced by a rotor may be strong enough to cause bending of the wires of these coils into what is known as the interpole region. Over time, such bending can result in mechanical breakdown of the wires and compromise of the coil insulation system. Additionally, because the coils are assemblies of individual wires that can move to some extent with respect to one another and with respect to the remaining portions of the rotors, the coils are a potential source of imbalance within the rotor and can potentially compromise the insulation system. Even asymmetrical movements of these coils on the order of only a few thousandths of an inch can, in some instances, be significant.

In order to improve the strength and reliability of the wire coils and the coil insulation system, and to minimize the amount of imbalance in the rotors that may occur due to the wire coils, the rotors may include a coil retention system. With a coil retention system, substantially rigid wedges are inserted in between neighboring poles of the rotors to reduce the likelihood of coil wire bending or movement. In some embodiments, the wedges may also exert some force onto the coils to help maintain the physical arrangement of the coils.

Although the wedges employed in conventional coil retention systems are capable of providing the above-described benefits to some extent, the design of these conventional wedges also limits their effectiveness. In particular, the loading on the wedges and other components used in a conventional retention system may be affected by tolerance accumulation and assembly variations, which can result in coil movement and loading regimes that can adversely affect generator performance and reliability. Because conventional wedges may be made of metal and hence are rigid, they are less likely to alleviate any of these potential tolerance accumulations and assembly variations.

From the foregoing, there is a need for a system and method of providing coil retention in high speed generators that addresses the one or more of the above-noted drawbacks. Namely, there is a need for a coil retention system and method that will work under circumstances involving tolerance accumulation and/or assembly variations in the rotor. The present invention addresses this need.

SUMMARY OF THE INVENTION

The present invention provides a high speed generator, and components and methods relating to a high speed generator, with a coil retention system that works despite tolerance accumulations or assembly variations in the rotor assembly.

In one embodiment of the present invention, and by way of example only, a rotor for use in a high speed generator includes a shaft, at least first and second poles, a first coil, a second coil, and a coil interpole wedge. Each pole extends radially outwardly from the shaft and is spaced apart from one another to form an interpole region therebetween. The first coil is wrapped around the first pole and has a first outer surface including two sides. The second coil is wrapped around the second pole and has a second outer surface including two sides. The coil interpole wedge has at least one piece of a compliant, porous material coupled to an outer surface thereof, and is positioned in the interpole region such that the compliant, porous material is in contact with at least a portion of one of the sides of the first outer face and one of the sides of the second outer face.

In another exemplary embodiment, a high speed generator includes a stator and a rotor. The rotor is rotationally mounted and includes a shaft, at least first and second poles, a first coil, a second coil, and a coil interpole wedge. Each pole extends radially outwardly from the shaft and is spaced apart from one another to form an interpole region therebetween. The first coil is wrapped around the first pole and has a first outer surface including two sides. The second coil is wrapped around the second pole and has a second outer surface including two sides. The coil interpole wedge has at least one piece of a compliant, porous material coupled to an outer surface thereof, and is positioned in the interpole region such that the compliant, porous material is in contact with at least a portion of one of the sides of the first outer face and one of the sides of the second outer face.

In yet another exemplary embodiment, a method of making a rotor for a high speed generator, includes the steps of providing a shaft and forming at least a first pole and a second pole on the shaft that extend radially outwardly from the shaft and are spaced apart from one another to form an interpole region therebetween. A first coil is wrapped around the first pole and has a first outer surface including two sides. A second coil is wrapped around the second pole and has a second outer surface including two sides. At least one interpole wedge having an outer surface is provided, and at least one piece of a compliant material is coupled to the interpole wedge outer surface. The wedge is then inserted into the interpole region.

In another embodiment, an interpole wedge for placement in an interpole region that is formed between adjacent poles of a rotor assembly of a high speed generator includes a main body and at least one piece of compliant material. The main body extends longitudinally and has an outer surface sized to fit in the interpole region, and the compliant material is coupled to the outer surface of the body.

In still a further embodiment, a method of modifying a rotor that has at least one coil retainer in an interpole region and is used in a high speed generator, the method includes the steps of removing the coil retainer from the rotor interpole region, and installing a coil retention interpole wedge in the rotor interpole region, the coil retention interpole wedge having at least one piece of a compliant material to an outer surface thereof.

In yet still a further embodiment, a method of making an interpole wedge for placement in an interpole region of a rotor of a high speed generator includes the steps of forming an interpole wedge having an outer surface, and coupling at least one piece of a compliant material to the outer surface of the interpole wedge.

In yet a further embodiment, a method of replacing one or more pieces of compliant material coupled to an outer surface of a high speed generator rotor coil retention interpole wedge with an adhesive includes removing one or more pieces of the compliant material from the interpole wedge outer surface, removing at least a portion of the adhesive, applying a replacement adhesive to at least a portion of the interpole wedge outer surface, and coupling one or more pieces of replacement compliant material to the interpole wedge outer surface using the applied adhesive.

Other independent features and advantages of the preferred embodiment will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present invention is, for convenience of explanation, depicted and described as being implemented in a brushless AC (alternating current) generator, it will be appreciated that it can be implemented in other AC generator designs needed in specific applications, and other electrical machines, such as various AC motor designs.

Figure 1:
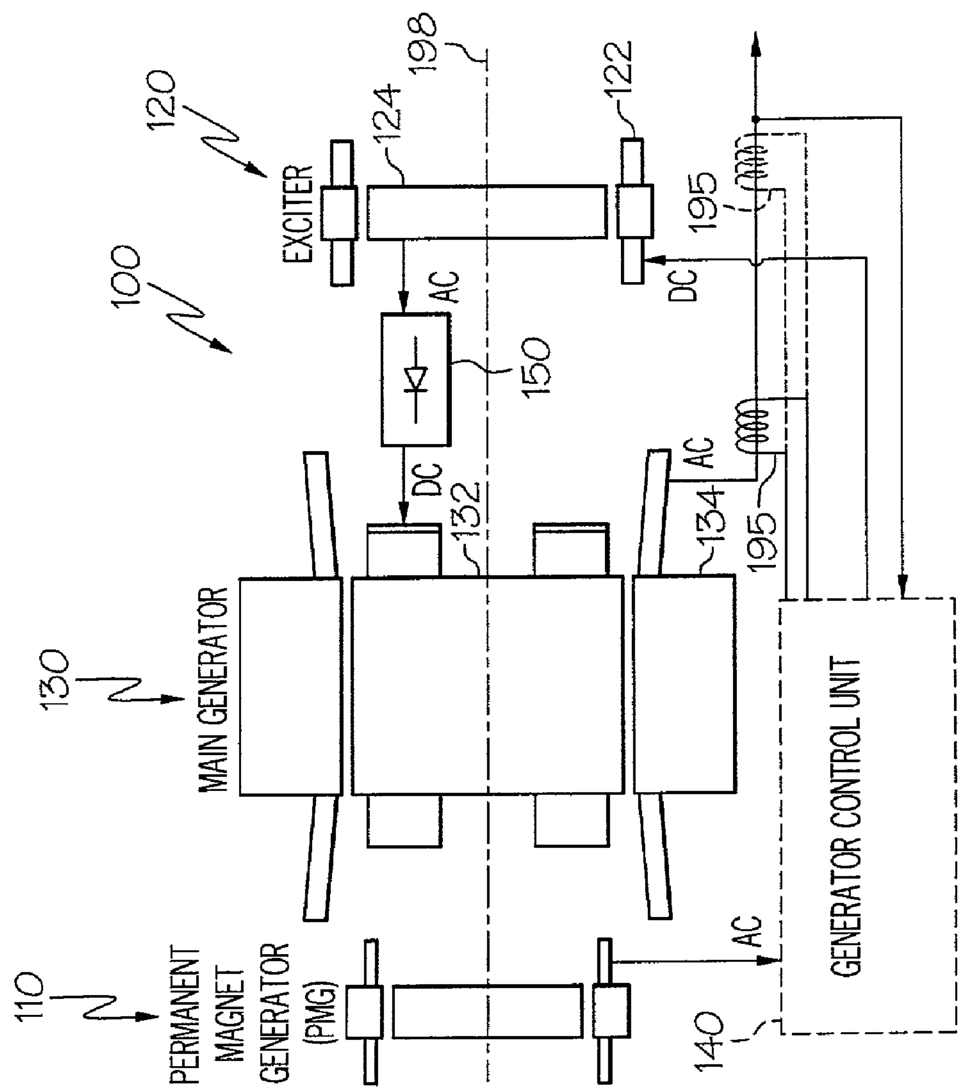
FIG. 1 is a functional schematic block diagram of an exemplary high speed generator system.

Turning now to the description, and with reference first to FIG. 1, a functional schematic block diagram of an exemplary high speed generator system 100 for aircraft, and which may include an embodiment of the present invention, is depicted. This exemplary generator system 100, which is commonly known as a brushless AC generator, includes a permanent magnet generator (PMG) 110, an exciter 120, a main generator 130, a generator control unit 140, and one or more a rectifier assemblies 150. During operation, the PMG 110, exciter 120, and portions of the main generator 130 all rotate. As the PMG 110 rotates, it generates and supplies AC power to a generator control unit 140, which in turn supplies direct current (DC) power to a stator 122 of the exciter 120. A rotor 124 of the exciter 120 in turn supplies AC power to the rectifier assemblies 150. The output from the rectifier assemblies 150 is DC power and is supplied to a main generator rotor 132, which in turn outputs AC power from a main generator stator 134.

Figure 2:
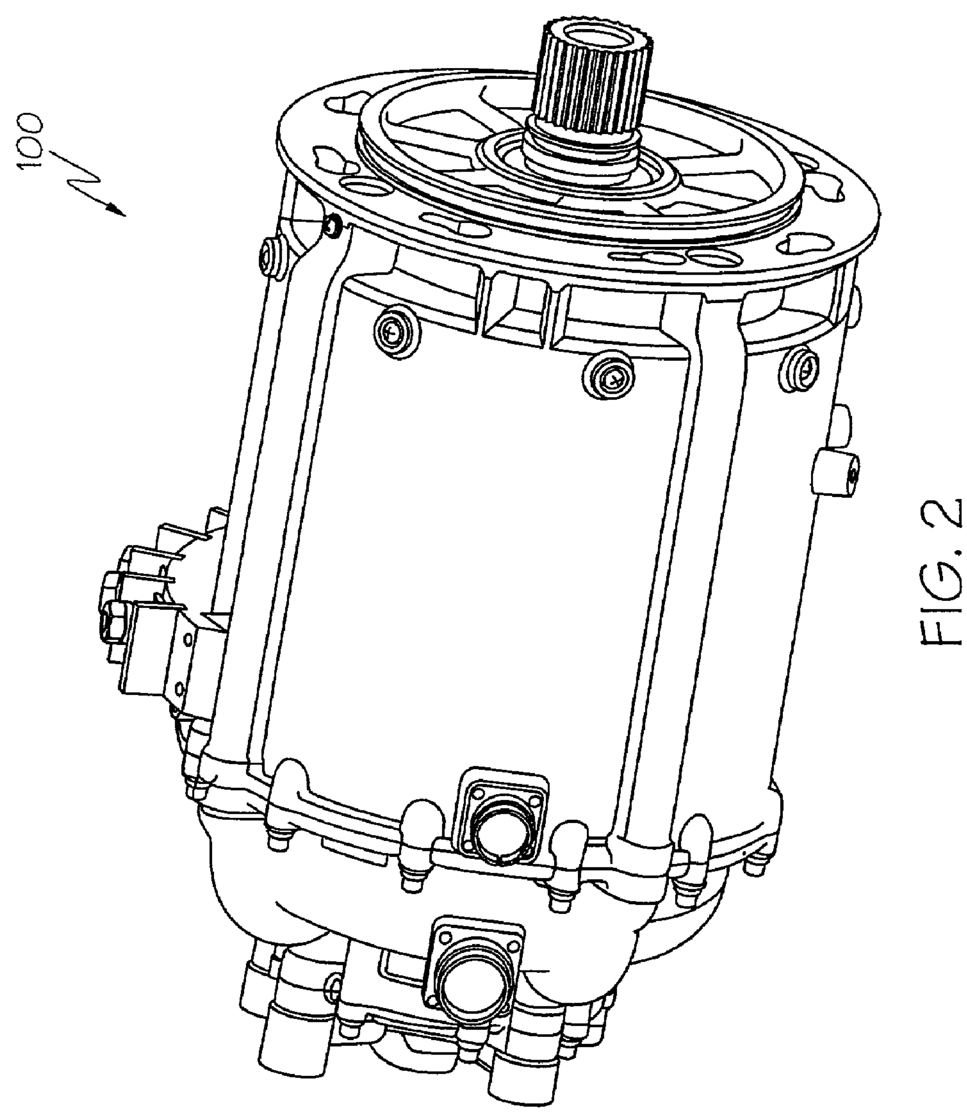
FIG. 2 is a perspective view of a physical embodiment of the generator system depicted in FIG. 1.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG 110, the exciter 120, and the main generator 130 all rotate along a single axis 198 at the same rotational speed. It will be appreciated, however, that in other embodiments the PMG 110 may rotate along a different axis. Moreover, the relative positioning of the PMG 110, the exciter 120, and the main generator 130 can be modified in different embodiments such that the exciter 120 is physically between the PMG 110 and the main generator 130. A perspective view of a physical embodiment of the generator system 100 is provided in FIG. 2.

Figure 3:
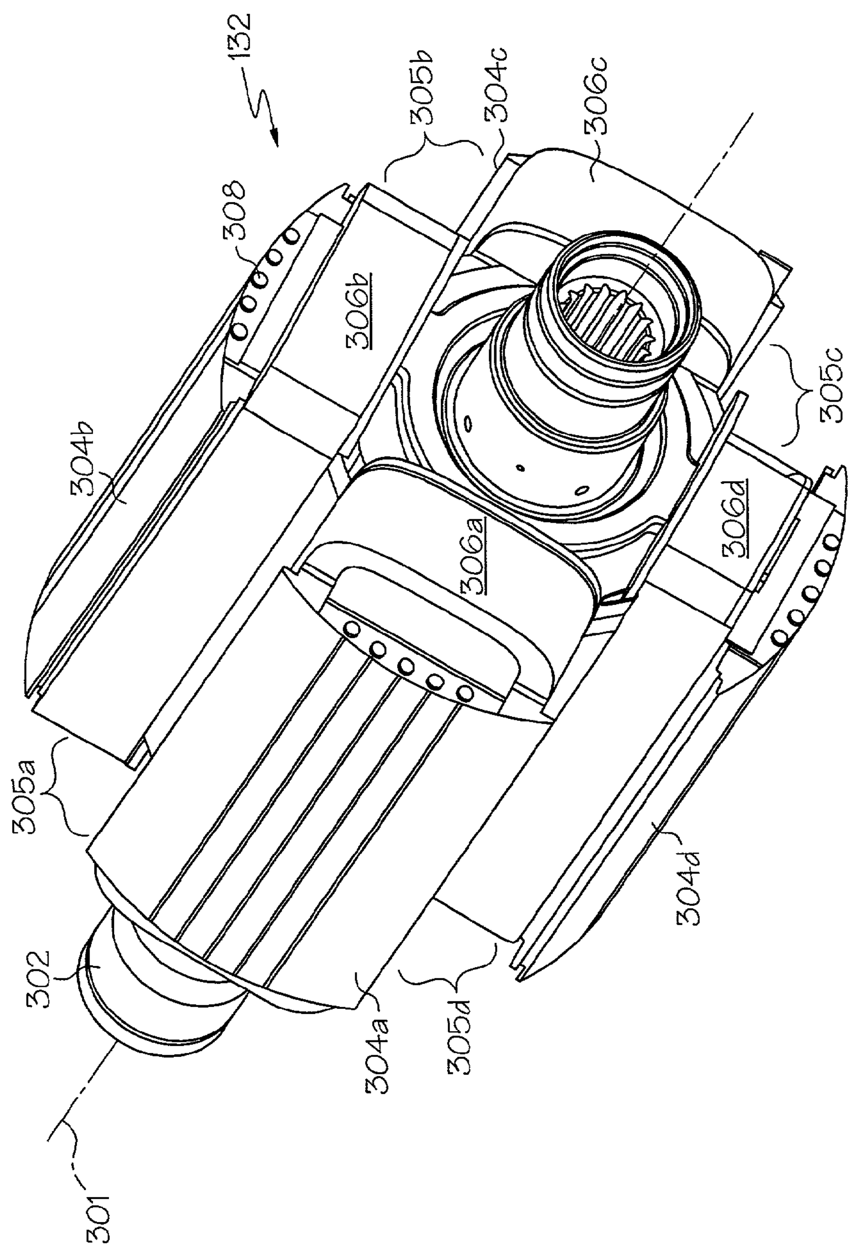
FIG. 3 is a perspective view of an exemplary embodiment of a rotor that may be used in the generator depicted in FIG. 2.

Turning now to FIG. 3, a perspective view of an exemplary embodiment of the main generator rotor 132 is depicted. As shown, the rotor 132 includes a shaft 302, a plurality of poles 304*a–d*, and a plurality of coils 306*a–d*. The shaft 302 extends axially through the rotor 132 along an axis 301. Each of the poles 304*a–d* extends radially away from the shaft 302 and are generally spaced evenly apart from one another, forming an interpole region 305*a–d* between adjacent poles 304*a–d*. In addition, a plurality of weights 308 may be embedded within each of the poles 304*a–d* to provide proper balancing of the rotor 132. As noted above, the depicted rotor 132 is designed for use in a high speed generator, such as those commonly employed in aircraft. Thus, the components of the rotor 132 are typically manufactured from high-strength materials. For example, the poles 304*a–d* may be formed from steel, while the shaft 302 may be formed from steel, titanium or high-strength aluminum. It will be appreciated, however, that these materials are only exemplary of a preferred embodiment and that other suitable materials can be employed. Moreover, although the rotor 132 depicted in FIG. 3 is a four-pole rotor, it will be appreciated that the present invention may be used with rotors having other numbers of poles.

Figure 4:
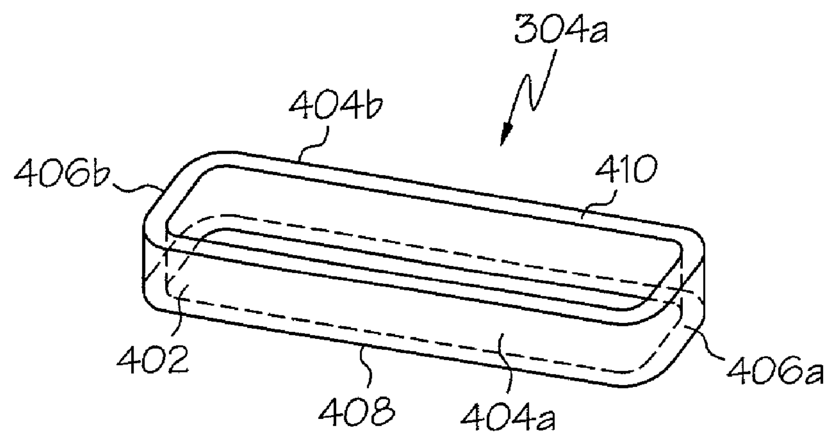
FIG. 4 is a perspective view of an exemplary embodiment of a rotor coil that may be used with the rotor depicted in FIG. 3.

The coils 306*a–d* are wrapped, one each, around a respective pole 304*a–d*, and are preferably formed by wrapping numerous individual wire windings around the respective poles 306*a–d*. For clarity, one of the coils 304*a*, which is representative of each of the coils 304*a–d*, is depicted in FIG. 4. As illustrated in this figure, the coil 304*a* includes an outer surface 402 around the outer perimeter of the coil that is formed from the outermost layer of wire windings of the coil 304*a*. The outer surface 402 includes two sides 404*a,b* and two end turns 406*a,b*. The outer surface sides 404*a,b* are made up of wire segments that are wrapped across the sides of the pole 304*a* and that predominantly follow directions parallel to the axis 301. In contrast, the end turns 406*a,b* are made up of wire segments that loop around the ends of the pole 304*a* and that follow paths that are predominantly within planes that are perpendicular to the axis 301. The coil 306*a* also includes an inward-facing edge 408, which faces the shaft 302, and an outward-facing edge 410, which faces away from the shaft 302. It is noted that the coils 304*a–d* may be formed of any one of numerous conductors, but in a preferred embodiment are formed from copper.

Figure 5:
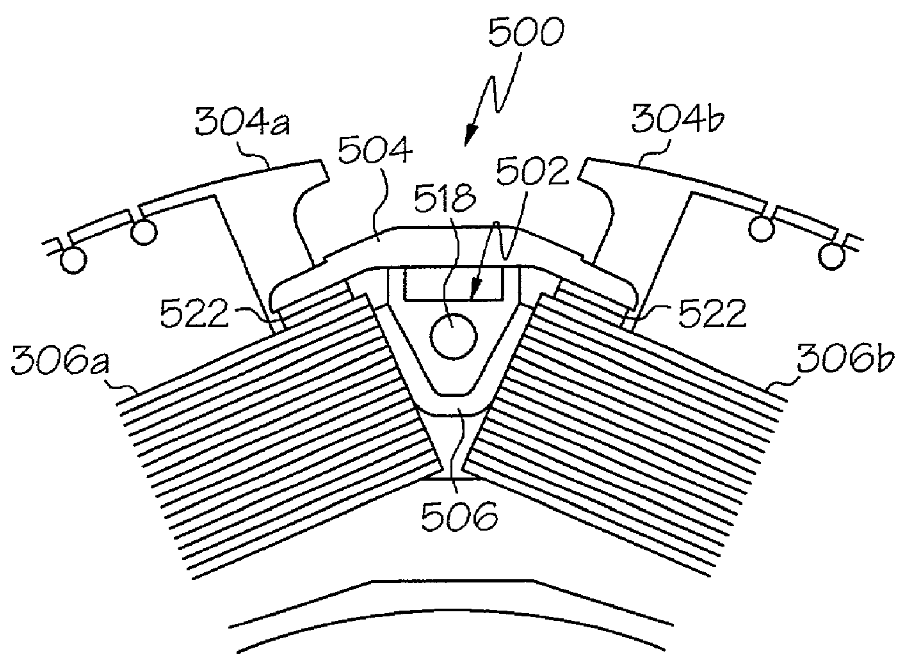
FIG. 5 is a partial end view of the rotor depicted in FIG. 2 with a coil retention system installed.

As was noted above, many high speed generators include a coil retention system to improve the strength and reliability of the coils 304*a–d*, to increase the life of the coil insulation system, and to minimize any rotor imbalance that may occur from movement of the coils 304*a–d*. Turning now to FIG. 5, a detailed description of a coil retention system 500 according to an embodiment of the present invention will be provided. For clarity, it is noted that only two poles 304*a,b*, two coils 306*a,b*, and a single wedge retention system 500 are depicted in FIG. 5. However, it is to be appreciated that this figure is representative of the remainder of the poles 304*c,d*, coils 306*c,d*, and retention systems 500. As FIG. 5 illustrates, the coil retention system 500 includes an interpole wedge 502, an interpole wedge retainer 504, and one or more pieces of a compliant material 506. The compliant material 506 is coupled to the interpole wedge 502, which is interference fit into the interpole region 305*a* between the coils 306*a,b* of adjacent poles 304*a,b*, thereby providing lateral support for the coils 306*a,b*. The interpole wedge retainer 504 is placed over, and in abutting contact with, the interpole wedge 502, and is interference fit between the respective poles 304*a,b* and coils 306*a,b*.

Figure 6:
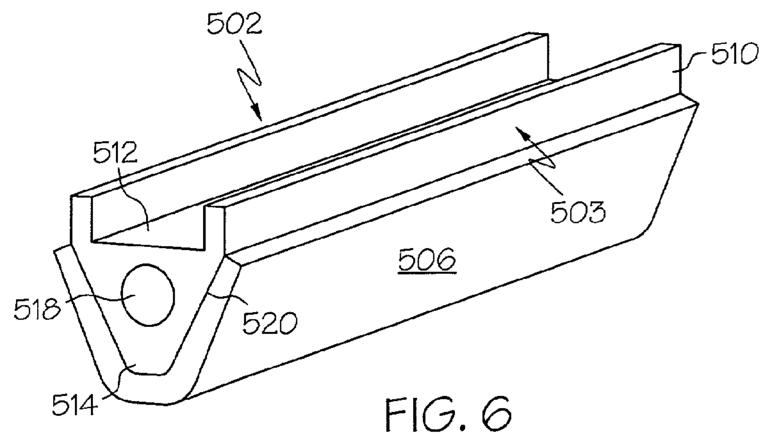
FIG. 6 is a perspective view of an exemplary coil retention interpole wedge according to an embodiment of the present invention.
Figure 7:
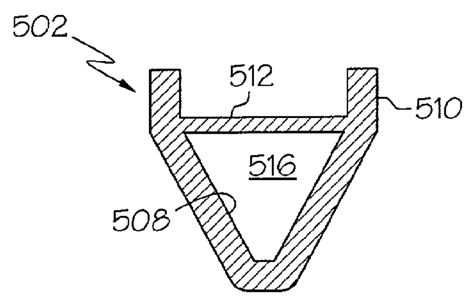
FIG. 7 is a cross section view of the coil retention interpole wedge depicted in FIG. 6, without any compliant material coupled thereto.

More particularly, and with reference to FIGS. 6 and 7, which depict a perspective view of the interpole wedge 502 with the compliant material adhered to it, and a cross section view of the interpole wedge 502 alone, respectively, it can be seen that the interpole wedge 502 has a longitudinally extending main body 503 that is generally V-shaped in cross section, and includes an inner surface 508, an outer surface 510, a top plate 512, and two end plates 514 (though only one is visible). Together, the inner surface 508 and top plate 512 form a passage 516 that extends through the entire length of the interpole wedge 502. Forming the interpole wedge 502 with the passage 516 reduces the overall weight of the interpole wedge 502 when compared with a solid wedge, thus reducing the overall centrifugal loading on the rotor 132. The two end plates 514 each include an opening 518 into the passage 516. These openings 518 allow a cooling medium (e.g., air, oil, or other fluid) to flow through the passage 516, which assists in removing heat from the coils 306*a,b*. The top plate 512 provides lateral strength for the interpole wedge 502. The interpole wedge 502 is preferably formed from a high strength, relatively lightweight material, such as titanium, though other suitable materials, such as aluminum, may also be used as needed for particular applications. It will be appreciated that the generally V-shaped cross section is merely exemplary of a preferred embodiment and that the interpole wedges 502 may have other cross sectional shapes, and that other interpole wedge geometries such as, for example, an open vee wedge design, may also be used.

Figure 8:
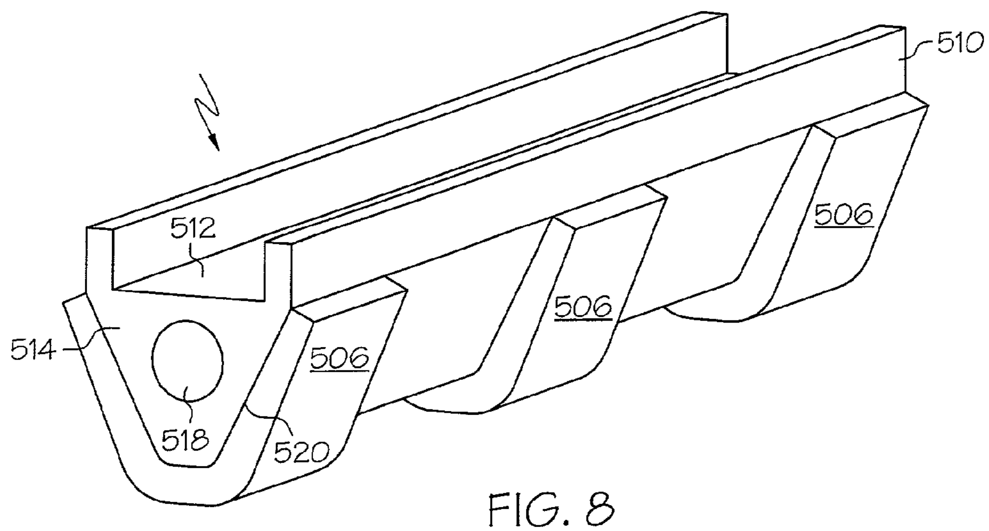
FIG. 8 is a perspective view of an alternate exemplary coil retention interpole wedge according to an embodiment of the present invention.
Figure 9:
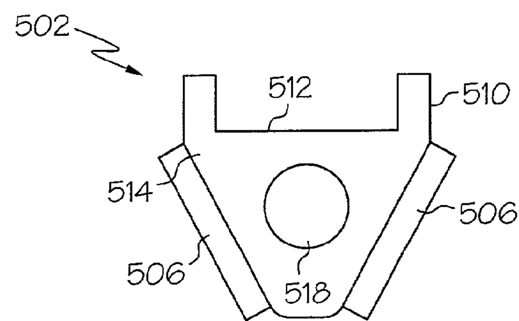
FIG. 9 is an end view of yet another alternate exemplary coil retention interpole wedge according to an embodiment of the present invention.

The compliant material 506 is adhered to the outer surface 510 of the interpole wedge 502 and, as depicted clearly in FIG. 6, is preferably substantially the same length as the interpole wedge 502. The compliant material 506 is preferably adhered to the interpole wedge outer surface 510 using a double-sided adhesive tape 520, though other suitable adhesives may also be used and in some cases no adhesive may be used. The compliant material 506 is also preferably porous. In particular, the compliant material 506 is preferably sufficiently porous to allow an epoxy or resinous fluid to permeate through it when the rotor 132 is subject to a vacuum pressure impregnation (VPI) process as part of its normal assembly process (discussed further below). Alternatively, other impregnation processes or techniques such as, for example, directly applying the epoxy or resinous fluid to the compliant material 506, may also be used. The epoxy or resinous fluid hardens the compliant material 506 during the VPI process, so that it is able to withstand the centrifugal loads experienced by the interpole wedges 502 during generator operation. In a preferred embodiment, the compliant material 506 is constructed of high temperature needlefelt aramid fibers, though it will be appreciated that other types of high temperature porous materials that can withstand the VPI process may also be used. The compliant material 506 may then be impregnated with any known epoxy or resin used in conventional generator VPI processes. As FIG. 8 illustrates, it will be appreciated that a plurality of strips of the compliant material 506 may be adhered along the interpole wedge outer surface 510, rather than a single piece of compliant material 506. Moreover, as depicted in FIG. 9, which is an end view of the interpole wedge 502, the compliant material 506 need not be adhered to the entire interpole wedge outer surface 508.

Figure 10:
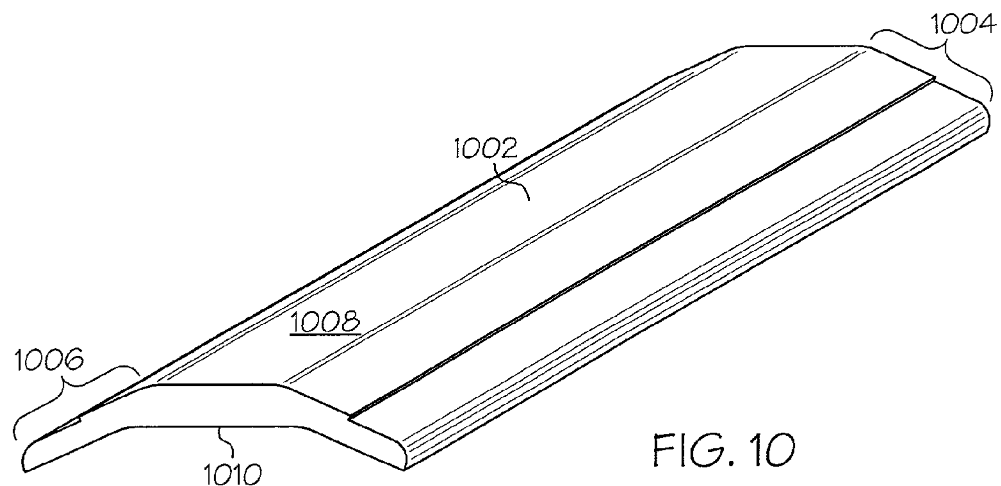
FIG. 10 is a perspective view of an exemplary wedge retainer according to an embodiment of the present invention.

The interpole wedge retainer 504, as depicted more clearly in FIG. 10, includes a main body 1002 and two sides 1004, 1006. The main body 1002 extends longitudinally in a plane, and has an upper surface 1008 and a lower surface 1010. The two sides 1004, 1006 extend from the main body 1002 and, in the depicted embodiment, do so at a predetermined angle relative to the plane of the main body 1002. Thus, as shown in FIG. 5, the lower surface 1010 of the main body 1002 is placed over, and in abutting contact with, at least a portion of the interpole wedge 502. In addition, one of the sides 1004 of the interpole wedge retainer 504 is interference fit between the outwardly facing edge 408 of one of the coils 306*a* and a surface 506*a* of its corresponding pole 304*a*, and the other side 1006 is interference fit between the outwardly facing edge 408 of the other coil 306*b* and a surface 506*b* of its corresponding pole 304*b*. As FIG. 5 additionally depicts, a plurality of shims 522 may be placed between the outwardly facing edges 408 of the coils 306*a,b* and the sides 1004, 1006 of the interpole wedge retainer 504 to provide a tight fit. It will be appreciated that the interpole wedge 502 and interpole wedge retainer 504 may be dimensioned so that the shims 516 need not be used.

Having described an embodiment from a structural standpoint, a method of assembling the rotor wedging system 500 described above, and the rotor 132 using the rotor wedging system 500 will now be described.

For each interpole wedge 502 that is to be installed into the rotor 132, a piece of the double-sided adhesive tape 520 (or other adhesive) is applied to the interpole wedge outer surface 510 (or portions thereof if the embodiment of FIG. 7 is being made). Thereafter, one or more pieces of the compliant material 506 are coupled to the outer surface 510 of each interpole wedge 502 using the double-sided adhesive tape 520. The interpole wedges 502 are now ready to be installed into the rotor 132.

The rotor 132 is produced using any one of numerous known processes for producing a rotor, up to the point where the rotor wedging system 500 is to be installed. Once the rotor 132 is ready to receive the wedging system 500, and each of the interpole wedges 502 is ready for installation, each of the interpole wedges 502 is fit into one of the interpole regions 305*a–d*. Temporary wedge retainers 1202 (see FIG. 12) are then installed into place in the interpole regions 305*a–d*. It will be appreciated that the wedge retainers 504 used in the final rotor 132 product may also be used during this portion of the process, rather than the temporary wedge retainers 1202.

Figure 11:
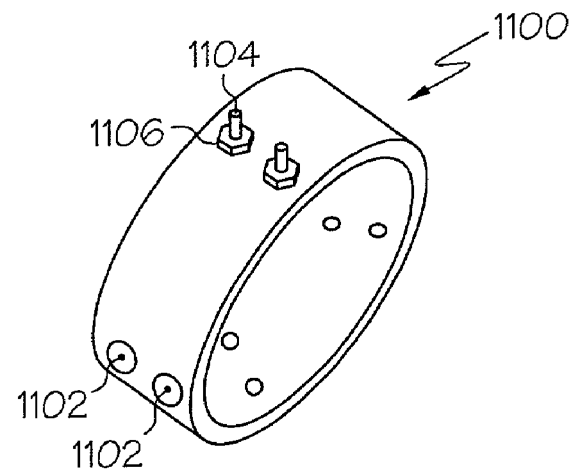
FIG. 11 is a perspective view of a compression tool that may be used to install the coil retention system depicted in FIG. 5.

After all of the interpole wedges 502 and the temporary wedge retainers 1202 are in place, a compression tool 1100, depicted in FIG. 11, is placed over the rotor 132 so that it is positioned centrally over the core of the rotor 132. The compression tool 1100, includes a plurality of threaded openings 1102 spaced circumferentially around it. These openings 1102 are spaced apart so that two or more are collocated with each of the rotor interpole regions 305*a–d*. Each of the openings 112 is threaded and receives a threaded swivel bolt 1104, around which a threaded lock nut 1106 may be placed. Once the compression tool 1100 is centered over the rotor 132, the swivel bolts 1104 are tightened to a predetermined torque magnitude to sufficiently compress the compliant material 506.

Figure 12:
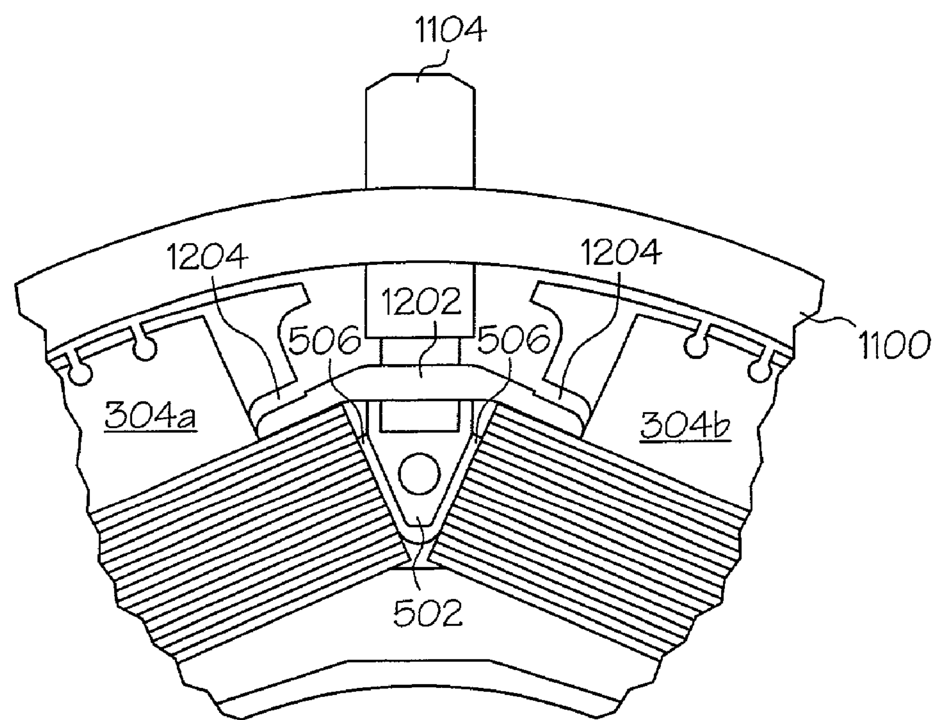
FIG. 12 is a partial end view of a rotor with a coil retention interpole wedge and the compression tool of FIG. 11 installed.

As FIG. 12 depicts, once the swivel bolts 1104 are tightened, a radial gap 1204 may exist between the temporary wedge retainers 1202 and the insulated poles 304*a,b*. The radial gaps 1204 on both sides of the temporary wedge retainers 1202 and at both ends of the poles 304*a–d* are measured and recorded. In a preferred embodiment, the two end measurements for each side of the poles 304*a,b* are averaged to produce one gap measurement for each side of the poles 304*a,b*. The compression tool 1100 is then removed.

Using the measured radial gaps, an appropriate combination of shims 522 is selected for each rotor pole 304*a–d* that will fill the radial gaps 1204. With the temporary wedge retainers 1202 and the interpole wedges 502 removed, the shims 522 are adhered to the insulations material surrounding the outward facing edge 408 of each coil 304*a–d*. The interpole wedges 502 and wedge retainers 504 are then installed into the rotor 132. Thereafter, the compression tool 1100 is placed back into position over the rotor 132, and the swivel bolts 1104 are re-tightened to the predetermined torque value. The radial gaps 1204 are once again measured and if any exceeds a predetermined magnitude, such as, for example, 0.001-inches, the shims 522 are removed and replaced with a new combination of shims 522. The check is then repeated. It will be appreciated that the wedge retainers 504 and/or the shims 522 may not be used in all generator applications. In addition, the compression tool 1100 may not be used to install the wedge retention system 500 in some generator applications.

Once all of the interpole wedges 502, interpole wedge retainers 504, and shims 522 are properly installed, the rotor 132 is ready to proceed through the remainder of its normal processing. This processing may include applying an epoxy or resin to the rotor 132, and then subjecting it to a VPI process. During the VPI process, the epoxy or resin permeates the compliant material 506 and, when cured, hardens the compliant material 506. After the rotor 132 is fully processed it is ready to be installed into the generator system 100.

The coil retention system 500 may also be used to modify existing rotors 132 by removing the installed coil retainers and replacing them with the interpole wedges 502 having the compliant material 506 coupled to thereto.

The coil retention system described above uses compliant material to fill variable dimension voids and/or gaps in the coils wound around the rotor of an electrical machine. During subsequent processing, the compliant material hardens and is capable of withstanding the centrifugal loads imposed by, and environmental conditions within, a high-speed rotating electrical machine, such as a generator or rotor.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A rotor for use in a high speed generator, comprising:

a shaft;

at least a first and a second pole, each pole extending radially outwardly from the shaft and spaced apart from one another to form an interpole region therebetween;

a first coil wrapped around the first pole, the first coil having an outer surface including two sides;

a second coil wrapped around the second pole, the second coil having an outer surface including two sides; and a coil interpole wedge having at least one piece of a compliant, porous material coupled to an outer surface thereof, the coil interpole wedge positioned in the interpole region such that the compliant, porous material is in abutting contact with at least a portion of one of the sides of the first coil outer surface and one of the sides of the second coil outer surface.

2. The rotor of claim 1, wherein the first coil has a first outwardly facing edge, and the second coil has a second outwardly facing edge, each of the outwardly facing edges facing generally away from the shaft, and wherein the rotor further comprises:

a coil interpole wedge retainer having an intermediate portion and first and second side portions extending from the intermediate portion, wherein:

(i) the intermediate portion is positioned over, and in abutting contact with, the coil interpole wedge, (ii) the first side portion is interference fit between the first outwardly facing edge and a surface of the first pole, and (iii) the second side portion is interference fit between the second outwardly facing edge and a surface of the second pole.

3. The rotor of claim 2, further comprising:

at least one shim coupled to each of the first and second outwardly facing edges, and positioned between the first and second outwardly facing edges and the first and second side portions, respectively.

4. The rotor of claim 1, wherein the compliant material comprises needlefelt aramid fiber cloth.

5. The rotor of claim 1, further comprising:

at least one piece of double-sided adhesive tape coupled between the coil interpole wedge outer surface and the compliant material.

6. A high speed generator, comprising:

a stator; and a rotor rotationally mounted within the stator, the rotor including:

a shaft;

at least a first and a second pole, each pole extending radially outwardly from the shaft and spaced apart from one another to form an interpole region therebetween, a first coil wrapped around the first pole, the first coil having an outer surface including two sides, a second coil wrapped around the second pole, the second coil an outer surface including two sides, and a coil interpole wedge having at least one piece of a compliant, porous material coupled to an outer surface thereof, the coil interpole wedge positioned in the interpole region such that the compliant, porous material is in abutting contact with at least a portion of one of the sides of the first coil outer surface and one of the sides of the second coil outer surface.

7. The generator of claim 6, wherein the first coil has a first outwardly facing edge, and the second coil has a second outwardly facing edge, each of the outwardly facing edges facing generally away from the shaft, and wherein the rotor further comprises:

a coil interpole wedge retainer having an intermediate portion and first and second side portions extending from the intermediate portion, wherein:

(i) the intermediate portion is positioned over, and in abutting contact with, the coil interpole wedge, (ii) the first side portion is interference fit between the first outwardly facing edge and a surface of the first pole, and (iii) the second side portion is interference fit between the second outwardly facing edge and a surface of the second pole.

8. The generator of claim 7, further comprising:

at least one shim coupled to each of the first and second outwardly facing edges, and positioned between the first and second outwardly facing edges and the first and second side portions, respectively.

9. The generator of claim 6, wherein the compliant material comprises needlefelt aramid fiber cloth.

10. The generator of claim 6, further comprising:

at least one piece of double-sided adhesive tape coupled between the coil interpole wedge outer surface and the compliant material.

11. A method of making a rotor for a high speed electrical machine, comprising:

providing a shaft;

forming at least a tint pole and a second pole on the shaft that extend radially outwardly from the shaft and are spaced apart from one another to form an interpole region therebetween;

wrapping a first coil around the first pole, the first coil having an outer surface including two sides;

wrapping a second coil the second pole, the second coil having an outer surface including two sides;

providing at least one interpol wedge having an outer surface;

coupling a piece of a compliant, porous material to the interpole wedge outer surface; and inserting the interpole wedge into the interpole region such that the piece of compliant, porous material is in abutting contact with at lest a portion of one of the sides of the first coil outer surface and one of the sides of the second coil outer surface.

12. The method of claim 11, further comprising:

coupling at least one piece of double-sided adhesive tape to the interpole wedge outer surface; and coupling the compliant material to the double-sided adhesive tape.

13. The method of claim 11, wherein the first coil has a first outwardly facing edge, and the second coil has a second outwardly facing edge, each of the outwardly facing edges facing generally away from the shaft, and wherein the method further comprises:

inserting a wedge retainer having an intermediate portion, and first side and second side portions each extending from the intermediate portion, into the interpole region such that (i) the intermediate portion is positioned over, and in abutting contact with, the interpole wedge, (ii) the first side portion is interference fit between the first outwardly facing edge and a surface of the first pole, and (iii) the second side portion is interference fit between the second outwardly facing edge and a surface of the second pole; and applying a predetermined force magnitude to the wedge retainer intermediate portion, whereby the interpole wedge is pressed into the interpole region.

14. The method of claim 13, further comprising:

determining a first distance between the wedge retainer first side portion and an insulated surface of the first pole;

determining a second distance between the wedge retainer second side portion and an insulated surface of the second pole; and coupling a first predetermined number of shims to the coil first side portion sufficient to fill the first distance; and coupling a second predetermined number of shims to the coil second side portion sufficient to fill the second distance.

15. The method of claim 14, further comprising:

inserting a wedge retainer having an intermediate portion, and first side and second side portions each extending from the intermediate portion, into the interpole region such that (i) the intermediate portion is positioned over, and in abutting contact with, the interpole wedge, (ii) the first side portion is interference fit between one of the first predetermined number of shims and the insulated surface of the first pole, and (iii) the second side portion is interference fit between one of the second predetermined number of shims and the insulated surface of the second pole.

16. The method of claim 11, further comprising:

impregnating at least the compliant material with a hardening agent.

17. The method of claim 16, further comprising:

subjecting the rotor to a vacuum pressure impregnation process.

* * * * *

UNITED STATES PATENT AND TRADEMARK OFFICE

CERTIFICATE OF CORRECTION

PATENT NO. : 7,015,616 B2
APPLICATION NO. : 10/113701
DATED : March 21, 2006
INVENTOR(S) : Kieran P.J. Doherty et al.

It is certified that error appears in the above-identified patent and that said Letters Patent is hereby corrected as shown below:

In Column 9, line 65, delete "tint" and add --first--.

Signed and Sealed this

Twenty-seventh Day of March, 2007

JON W. DUDAS
*Director of the United States Patent and Trademark Office*